United States Patent
Wideman et al.

(10) Patent No.: US 6,476,109 B1
(45) Date of Patent: Nov. 5, 2002

(54) RUBBER COMPOSITION COMPRISED OF CIS-1,4-POLYISOPRENE AND 4,4'-(PARA OR META-PHENYLENEDIISOPROPYLIDINE) DIANILINE AND ARTICLES, INCLUDING TIRES, HAVING AT LEAST ONE COMPONENT COMPRISED THEREOF

(75) Inventors: Lawson Gibson Wideman, Hudson, OH (US); Paul Harry Sandstrom, Tallmadge, OH (US); Sandra Jean Walters, Stow, OH (US)

(73) Assignee: The Goodyear Tire & Rubber Company, Akron, OH (US)

( * ) Notice: Subject to any disclaimer, the term of this patent is extended or adjusted under 35 U.S.C. 154(b) by 0 days.

(21) Appl. No.: 09/513,644

(22) Filed: Feb. 25, 2000

(51) Int. Cl.$^7$ .................................................. C08K 5/17
(52) U.S. Cl. ....................................................... 524/255
(58) Field of Search ......................................... 524/255

(56) References Cited

U.S. PATENT DOCUMENTS

| | | | |
|---|---|---|---|
| 4,094,831 A | 6/1978 | Sandstrom | 260/5 |
| 4,124,750 A | 11/1978 | O'Mahoney, Jr. | 526/20 |
| 4,198,324 A | 4/1980 | Lal et al. | 560/4 |
| 4,446,282 A | 5/1984 | Jalics | 525/327.7 |
| 4,574,140 A | 3/1986 | Sandstrom et al. | 525/123 |
| 4,790,365 A | 12/1988 | Sandstrom et al. | 152/510 |
| 5,283,294 A | 2/1994 | Hsu et al. | 525/247 |
| 5,883,139 A | 3/1999 | Wideman et al. | 521/43.5 |
| 6,013,736 A | 1/2000 | Castner | 525/331.9 |

*Primary Examiner*—Peter D. Mulcahy
(74) *Attorney, Agent, or Firm*—Henry C. Young, Jr.

(57) ABSTRACT

This invention relates to rubber compositions comprised of cis-1,4-polyisoprene and a 4,4'-(para or meta-phenylenediisopropylidine) dianiline and to articles of manufacture having at least one component comprised thereof, including tires. The 4,4'-(phenylenediisopropylidine) dianiline acid has been observed to enhance green strength of such rubber composition.

19 Claims, No Drawings

RUBBER COMPOSITION COMPRISED OF CIS-1,4-POLYISOPRENE AND 4,4'-(PARA OR META-PHENYLENEDILSOPROPYLIDINE) DIANILINE AND ARTICLES, INCLUDING TIRES, HAVING AT LEAST ONE COMPONENT COMPRISED THEREOF

FIELD

This invention relates to rubber compositions comprised of cis-1,4-polyisoprene and a 4,4'-(para or meta-phenylenediisopropylidine) dianiline and to articles of manufacture having at least one component comprised thereof, including tires. The 4,4'-(phenylenediisopropylidine) dianiline has been observed to enhance green strength of such rubber composition.

BACKGROUND OF THE INVENTION

A typical significant deficiency of unvulcanized rubber compositions which contain synthetic cis-1,4-polyisoprene are their usual lack of sufficient green strength and tack needed for satisfactory processing or building properties required in the building of articles of manufacture including the building of tires. The abatement of such usual deficiency has often been sought and may assist in facilitating a replacement, or at least a partial replacement, of natural rubber for appropriate rubber compositions.

The term "green strength", while being commonly employed and generally understood by persons skilled in the rubber industry, is nevertheless a difficult property to precisely define. Basically, green strength may be thought of as the tensile strength developed when an unvulcanized polymer composition of proper configuration is stressed under controlled conditions. Beyond an initial yield point, unvulcanized natural cis-1,4-polyisoprene rubber compositions will show increasing strength against rupture, or significant deformation, while unvulcanized synthetic cis-1,4-polyisoprene will typically fall below the yield point or will increase only slightly above it. In certain practical applications such as uncured tires, belting, shoes and a number of other products in the course of manufacture, green strength is important in promoting the integrity and cohesiveness, including dimensional stability, of the assembly of various rubber components between building or assembly thereof and the ultimate molding and accompanying vulcanization of the assembled article.

Green strength often manifests itself secondarily in the tack or adhesiveness imparted to various unvulcanized rubber compositions employed in the manufacture of a number of rubber articles such as tires, belting, etc. Other things being equal, an unvulcanized rubber or rubber composition having higher green strength will often exhibit better building tack or adhesion to other unvulcanized rubber-based components and will accordingly ease various fabrication, processing and handling problems associated with the building and the ultimate molding and vulcanization of fabricated articles.

Various additive compounds or agents which have heretofore been utilized to improve green strength of synthetic rubber elastomers, for example, numerous nitroso compounds as mentioned in U.S. Pat. Nos. 2,457,331, 2,477,015, 2,518,576, 2,526,504, 2,540,596, 2,690,780 and 3,093,614. Additionally, various compounds have been mentioned such as those described in U.S. Pat. Nos. 2,969,341, 3,037,954, 3,160,595 and British Patent No. 896,309. Yet another class of additives or compounds are the diesters of 5-norbonene as mentioned in U.S. Pat. Nos. 3,817,883 and 3,843,613. In U.S. Pat. No. 4,124,750 a dihydrazide compound is suggested for cross-linking a synthetic rubber to enhance its green strength.

In the description of this invention, the term "phr" is used to designate parts by weight of a material per 100 parts by weight of elastomer. In the further description, the terms "rubber" and "elastomer" may be used interchangeably unless otherwise mentioned. The terms "vulcanized" and "cured" may be used interchangeably, as well as "unvulcanized" or "uncured", unless otherwise indicated.

SUMMARY AND PRACTICE OF THE INVENTION

In accordance with this invention, a rubber composition comprised of cis-1,4-polyisoprene is provided which contains from about 0.1 to about 20, alternately about one to about 10, phr of at least one of 4,4'-(para-phenylenediisopropylidine) dianiline and 4,4'-(meta-phenylenediisopropylidine) dianiline, preferably, 4,4'-(para-phenylenediisopropylidine) dianiline.

Preferably said cis-1,4-polyisoprene elastomer is synthetic cis-1,4-polyisoprene because it typically possesses less green strength than natural cis-1,4-polyisoprene elastomer.

Alternately, the cis-1,4-polyisoprene may constitute both the natural and synthetic cis-1,4-polyisoprene elastomers or it may be a natural rubber.

It is to be appreciated that such rubber composition may contain other conjugated diene-based elastomers such as, for example homopolymers and copolymers of isoprene (other than cis-1,4-polyisoprene) and 1,3-butadiene and copolymers of isoprene and 1,3-butadiene with a vinyl aromatic compound such as styrene and/or alphamethyl styrene, preferably styrene.

In further accordance with this invention, a rubber composition comprises, based upon 100 parts by weight elastomers (phr), (A) 100 phr of unvulcanized conjugated diene based elastomers comprised of (1) about 10 to about 90, alternately about 20 to about 80, phr of cis-1,4-polyisoprene elastomer and, correspondingly (2) about 90 to about 10, alternately about 80 to about 20 phr of at least one additional conjugated diene-based elastomer, and (B) about 0.1 to about 20, alternately about one to about 10, phr of at least one of 4,4'-(para-phenylenediisopropylidine) dianiline and 4,4'-(meta-phenylenediisopropylidine) dianiline, preferably, 4,4'-(para-phenylenediisopropylidine) dianiline.

While the mechanism may not be entirely understood, it is believed that mixing the 4,4'-(p-phenylene diisopropylidine) dianiline and/or 4,4'-(m-phenylene diisopropylidine) dianiline, preferably the para-isomer, with the unvulcanized synthetic cis-1,4-polyisoprene elastomer effectively creates the strong interaction between the methyl-diene polymer chains and the methyl-phenylene of the dianiline compound, with a consistent strong interaction of the dianiline compound amino groups and the surface of the filler to thereby increase the green strength of the synthetic cis-1,4-polyisoprene. Usually a period of time for the mixing operation is in a range of about one to about thirty minutes, depending somewhat upon the mixing temperature used as well as the degree of interaction desired, including the degree of green strength enhancement of the synthetic cis-1,4-polyisoprene desired.

In practice, the 4,4'-(p-phenylene diisopropylidene)-dianiline, or 4,4'-(m-phenylene diisopropylidene) dianiline, might prepared, for example, by reacting m- or p- phenylene diisopropylalcohol or its corresponding diene with two molar quivalents of aniline.

The resulting rubber compositions may be used as various components of articles of manufacture, particularly various components of tires such as, for example sidewall, read, carcass ply and apex.

In the practice of this invention, as hereinbefore pointed out, the rubber composition of this invention may contain at least one additional diene-based elastomer. Thus, it is considered that the elastomer is a sulfur curable elastomer.

The additional diene based elastomer may be selected, for example, from homopolymers and copolymers of at least one diene selected from isoprene and 1,3-butadiene (other than the aforesaid natural and synthetic cis-1,4-polyisoprene) and copolymers of at least one diene selected from isoprene and 1,3-butadiene with a vinyl aromatic compound selected from at least one of styrene and alpha-methyl styrene, preferably styrene.

Representative of such additional elastomers are, for example, at least one of styrene/butadiene copolymer rubbers (aqueous emulsion polymerization derived and organic solvent solution polymerization derived), isoprene/butadiene copolymer rubbers, styrene/isoprene copolymer rubbers, styrene/isoprene/butadiene terpolymer rubbers, cis-1,4-polybutadiene rubber, high vinyl polybutadiene rubber with a vinyl 1,2-content in a range of about 30 to about 90 percent, emulsion polymerization prepared butadiene/acrylonitrile copolymers and a minor amount of 3,4-polyisoprene rubber.

The rubber composition is preferably comprised of at least two conjugated diene-based based elastomers.

In the further practice of this invention, particulate reinforcement for the rubber composition may be rubber reinforcing carbon black, amorphous silica, or a combination of such carbon black and silica, usually of an amount in a range of about 35 to about 100 alternately about 35 to about 90, phr. If a combination of such carbon black and silica is used, usually at least about 5 phr of carbon black and at least 10 phr of silica is used. For example, a weight ratio of silica to carbon black ranging from about 1/5 to 5/1 might be used.

Commonly employed amorphous silica, or siliceous pigments, used in rubber compounding applications can be used as the silica in this invention, including pyrogenic and precipitated siliceous pigments are precipitated and fumed silica wherein precipitated silicas are usually preferred.

The siliceous pigments preferably employed in this invention are precipitated silicas such as, for example, those obtained by the acidification of a soluble silicate, e.g., odium silicate.

Such silicas might be characterized, for example, by having a BET surface area, as measured using nitrogen gas, preferably in the range of about 40 to about 600, and more usually in a range of about 50 to about 300 square meters per gram. The BET method of measuring surface area is described in the *Journal of the American Chemical Society*, Volume 60, Page 304 (1930).

The silica may also be typically characterized by having a dibutylphthalate (DBP) absorption value in a range of about 50 to about 400 $cm^3/100$ g, and more usually about 100 to about 300 $cm^3/100$ g.

Various commercially available silicas may be considered for use in this invention such as, only for example herein, and without limitation, silicas commercially available from PPG Industries under the Hi-Sil trademark with designations 210, 243, etc; silicas available from Rhodia as, for example, Zeosil 1165MP and Zeosil 165GR, silicas available from Degussa AG with, for example, designations VN2 and VN3, as well as other grades of silica, particularly precipitated silicas, which can be used for elastomer reinforcement.

It is readily understood by those having skill in the art that the rubber composition would be compounded by methods generally known in the rubber compounding art, such as mixing the various sulfur-vulcanizable constituent rubbers with various commonly used additive materials such as, for example, curing aids, such as sulfur, activators, retarders and accelerators, processing additives, such as oils, resins including tackifying resins, silicas, and plasticizers, fillers, pigments, fatty acid, zinc oxide, waxes, antioxidants and antiozonants, peptizing agents and reinforcing materials such as, for example, carbon black. As known to those skilled in the art, depending on the intended use of the sulfur vulcanizable and sulfur vulcanized material (rubbers), the additives mentioned above are selected and commonly used in conventional amounts. Typical amounts of tackifier resins, if used, comprise about 0.5 to about 10 phr, usually about 1 to about 5 phr. Typical amounts of processing aids comprise about 1 to about 50 phr. Such processing aids can include, for example, aromatic, napthenic, and/or paraffinic processing oils. Typical amounts of antioxidants comprise about 1 to about 5 phr. Representative antioxidants may be, for example, diphenyl-p-phenylenediamine and others, such as, for example, those disclosed in The Vanderbilt Rubber Handbook (1978), Pages 344 through 346. Typical amounts of antiozonants comprise about 1 to 5 phr. Typical amounts of fatty acids, if used, which can include stearic acid comprise about 0.5 to about 3 phr. Typical amounts of zinc oxide comprise about 1 to about 10 phr. Typical amounts of waxes comprise about 1 to about 5 phr. Often microcrystalline waxes are used. Typical amounts of peptizers comprise about 0.1 to about 1 phr.

The vulcanization is conducted in the presence of a sulfur vulcanizing agent. Examples of suitable sulfur vulcanizing agents include elemental sulfur (free sulfur) or sulfur donating vulcanizing agents, for example, an amine disulfide, polymeric polysulfide or sulfur olefin adducts. Preferably, the sulfur vulcanizing agent is elemental sulfur. As known to those skilled in the art, sulfur vulcanizing agents are used in an amount ranging from about 0.5 to about 4 phr, or even, in some circumstances, up to about 8 phr.

Accelerators are used to control the time and/or temperature required for vulcanization and to improve the properties of the vulcanizate. In one embodiment, a single accelerator system may be used, i.e., primary accelerator. Conventionally and preferably, a primary accelerator(s) is used in total amounts ranging from about 0.5 to about 4, preferably about 0.8 to about 1.5, phr. In another embodiment, combinations of a primary and a secondary accelerator might be used with the secondary accelerator being used in smaller amounts (of about 0.05 to about 3 phr) in order to activate and to improve the properties of the vulcanizate. Combinations of these accelerators might be expected to produce a synergistic effect on the final properties and are somewhat better than those produced by use of either accelerator alone. In addition, delayed action accelerators may be used which are not affected by normal processing temperatures but produce a satisfactory cure at ordinary vulcanization temperatures. Vulcanization retarders might also be used. Suitable types of accelerators that may be used in the present invention are amines, disulfides, guanidines, thioureas, thiazoles, thiurams, sulfenamides, dithiocarbamates and xanthates. Preferably, the primary accelerator is a sulfenamide. If a second accelerator is used, the secondary accelerator is preferably a guanidine, dithiocarbamate or thiuram compound.

The presence and relative amounts of the above additives are not considered to be an aspect of the present invention, unless otherwise indicated herein, which is more primarily directed to the utilization of 4,4'-(para or meta-phenylenediisopropylidine) dianiline in various rubber compositions which contain cis-1,4-polyisoprene, particularly synthetic cis-1,4-polyisoporene elastomer.

The mixing of the rubber composition can be accomplished by methods known to those having skill in the rubber mixing art. For example, the ingredients are typically mixed in at least two stages, namely, at least one non-productive stage followed by a productive mix stage. The final curatives are typically mixed in the final stage which is conventionally called the "productive" mix stage in which the mixing typically occurs at a temperature, or ultimate temperature, lower than the mix temperature(s) than the preceding non-productive mix stage(s). The rubber, starch-based material, and fillers such as carbon black and optional silica and coupler, and/or non-carbon black and non-silica fillers, are mixed in one or more non-productive mix stages. The terms "non-productive" and "productive" mix stages are well known to those having skill in the rubber mixing art.

The following examples are presented to illustrate the invention and are not intended to be limiting. The parts and percentages are by weight unless otherwise designated.

EXAMPLE 1

A rubber composition comprised of an unvulcanized synthetic cis-1,4-polyisoprene elastomer was prepared by blending the unvulcanized synthetic cis-1,4-polyisoprene elastomer in an internal rubber mixer with 4,4'-(p-phenylene diisopropylidene) dianiline for a period of about 3 minutes to a temperature of about 160° C. as represented by Sample B and illustrated in the following Table 1.

Sample A is presented as a Control Sample in which the unvulcanized synthetic cis-1,4-polyisoprene rubber is not treated with the aforesaid dianiline compound to improve its green strength.

TABLE 1

| Material | Parts | |
| --- | --- | --- |
| | Sample A Control | Sample B |
| Non-Productive Mixing Step (3 minutes to 160° C.) | | |
| Cis-1,4-polyisoprene[1] | 100 | 100 |
| Carbon black[2] | 50 | 50 |
| Processing oil[3] | 5 | 5 |
| Zinc oxide | 5 | 5 |
| Antioxidant[4] | 2 | 2 |
| Stearic acid | 2 | 2 |
| Dianiline[5] | 0 | 1.5 |
| Productive Mixing Step (2 minutes to 108° C.) | | |
| Accelerator, sulfenamide | 1.5 | 1.5 |
| Sulfur | 1.0 | 1.0 |

[1]Synthetic cis-1,4-polyisoprene obtained as NAT 2200 from The Goodyear Tire & Rubber Company
[2]N299 carbon black, an ASTM designation
[3]Obtained as Flexon 641 from Exxon Chemical Company
[4]Quinoline type
[5]4,4'-(p-phenylene diisopropylidine) dianiline from the Aldrich Chemical Company Various physical properties of the rubber compositions of Table 1 were evaluated and reported in the following Table 2.

TABLE 2

| Material | Parts | |
| --- | --- | --- |
| | Sample A Control | Sample B |
| Unvulcanized Properties | | |
| Tensile strength (MPa) | 0.071 | 0.333 |
| Elongation (%) | 2541 | 2755 |
| Green Strength (MPa) | | |
| 40% elongation | 0.219 | 0.252 |
| 80% elongation | 0.243 | 0.271 |
| 120% elongation | 0.227 | 0.264 |
| 240% elongation | 0.160 | 0.212 |
| 480% elongation | 0.122 | 0.164 |
| Vulcanized Properties (36 minutes at 150° C.) Rheometer | | |
| T90 | 13.1 | 10.7 |
| Torque min (dNm) | 8.3 | 9.3 |
| Torque max (dNm) | 36.7 | 37.8 |
| Delta Torque (dNm) | 28.3 | 28.4 |
| Modulus, MPa | | |
| 100% | 2.05 | 2.15 |
| 200% | 5.79 | 6.05 |
| 300% | 11.83 | 12.29 |
| Ult Tensile strength (MPa) | 21.70 | 23.67 |
| Ult Elongation (%) | 487 | 514 |
| Hardness (Shore A) | | |
| 23° C. | 63.3 | 64.7 |
| 100° C. | 54.8 | 55.6 |
| Rebound, % | | |
| 23° C. | 50.0 | 49.1 |
| 100° C. | 65.7 | 63.0 |
| Strebler Adhesion 95° C., N | 110 | 99 |
| DIN Abrasion[1] | 117 | 116 |
| E' (0° C./60° C.) (MPa) | 23.6/13.5 | 27.7/17.2 |
| E"(0° C./60° C.) (MPa) | 2.75/1.09 | 2.62/1.22 |

[1]Relative volume loss whereas a lower value represents a lower volume loss and therefor a better resistance to abrasion.

It can readily be seen from Table 2 that the green strength as indicated by the force(s) to obtain the various elongation values of Sample B is significantly higher than Control Sample A.

This is considered herein to be significant because an improved green strength for an unvulcanized rubber composition which contains a significant content of synthetic cis-1,4-polyisoprene rubber is desired for preparation, or building, of many articles of manufacture, including tires.

It also can readily be seen from Table 2 that the state of cure, rebound, DIN abrasion, and hardness of the vulcanized rubber compound are substantially maintained even though the green strength of the unvulcanized synthetic cis-1,4-polyisoprene rubber is substantially, and beneficially, increased.

This is considered herein to be significant because it is desired to substantially increase the green strength of rubber compositions which contains a significant content of synthetic cis-1,4-polyisprene rubber while not affecting its vulcanized properties.

While various embodiments are disclosed herein for practicing the invention, it will be apparent to those skilled in this art that various changes and modifications may be made therein without departing from the spirit or scope of the invention.

What is claimed is:
1. A rubber composition comprised of cis-1,4-polyisoprene and from about 0.1 to about 20 phr of at least one of 4,4'-(para-phenylenediisopropylidine) dianiline and 4,4'-(meta-phenylenediisopropylidine) dianiline, wherein said cis-1,4-polyisoprene is selected from at least one of natural and synthetic cis-1,4-polyisoprene rubber and wherein said rubber composition contains from about 35 to about 100 phr of particulate reinforcement therefor comprised of at least one rubber reinforcing carbon black and amorphous silica.

2. The rubber composition of claim 1 wherein said 4,4'-(phenylenediisopropylidine) dianiline is 4,4'-(para-phenylenediisopropylidine) dianiline.

3. The rubber composition of claim 1 wherein said cis-1,4-polyisoprene is synthetic cis-1,4-polyisoprene.

4. The rubber composition of claim 1 wherein said cis-1,4-polyisoprene is a blend of synthetic and natural cis-1,4-polyisoprene.

5. The rubber composition of claim 1 which comprises, based upon 100 parts by weight elastomers (phr), (A) 100 phr of unvulcanized conjugated diene based elastomers comprised of (1) about 10 to about 90 phr of cis-1,4-polyisoprene elastomer and, correspondingly (2) about 90 to about 10 phr of at least one additional conjugated diene-based elastomer, and (B) about 0.1 to about 20 phr of at least one of 4,4'-(para-phenylenediisopropylidine) dianiline and 4,4'-(meta-phenylenediisopropylidine) dianiline.

6. The rubber composition of claim 5 wherein said 4,4'-(phenylenediisopropylidine) dianiline is 4,4'-(para-phenylenediisopropylidine) dianiline.

7. The rubber composition of claim 5 wherein said cis-1,4-polyisoprene is comprised synthetic cis-1,4-polyisoprene.

8. The rubber composition of claim 5 wherein said cis-1,4-polyisoprene elastomer is a blend of natural and synthetic cis-1,4-polyisoprene.

9. The rubber composition of claim 5 wherein said additional diene-based elastomer is selected from homopolymers and copolymers of at least one diene selected from isoprene and 1,3-butadiene and copolymers of at least one diene selected from isoprene and 1,3-butadiene with a vinyl aromatic compound selected from at least one of styrene and alphamethyl styrene.

10. The rubber composition of claim 5 wherein said additional diene based elastomer is selected from at least one of styrene/butadiene copolymer rubbers, isoprene/butadiene copolymer rubbers, styrene/isoprene copolymer rubbers, styrene/isoprene/butadiene terpolymer rubbers, cis-1,4-polybutadiene rubber, high vinyl polybutadiene rubber with a vinyl 1,2-content in a range of about 30 to about 90 percent, emulsion polymerization prepared butadiene/acrylonitrile copolymers and a minor amount of 3,4-polyisoprene rubber.

11. The rubber composition of claim 5 which contains at least two of said additional conjugated diene-based based elastomers.

12. An article of manufacture which contains at least one component which is comprised of the rubber composition of claim 1.

13. An article of manufacture which contains at least one component which is comprised of the rubber composition of claim 5.

14. A tire which contains at least one component which is comprised of the rubber composition of claim 1.

15. A tire which contains at least one component which is comprised of the rubber composition of claim 5.

16. The tire of claim 14 where said component is selected from at least one of a tread, sidewall, carcass ply and apex.

17. The tire of claim 15 where said component is selected from at least one of a tread, sidewall, carcass ply and apex.

18. A tire having a tread comprised of the rubber composition of claim 1.

19. A tire having a tread comprised of the rubber composition of claim 5.

* * * * *